Jan. 23, 1940.　　　　C. W. GANNETT　　　　2,187,777
WHEEL
Original Filed Oct. 15, 1934

INVENTOR.
CHAUNCEY W. GANNETT.
BY
His ATTORNEY.

Patented Jan. 23, 1940

2,187,777

UNITED STATES PATENT OFFICE 2,187,777

WHEEL

Chauncey W. Gannett, Wellington, Ohio, assignor to Wellington Machine Company, Wellington, Ohio, a corporation of Ohio Original application October 15, 1934, Serial No. 748,361. Divided and this application April 30, 1937, Serial No. 139,981

2 Claims. (Cl. 301—105)

My invention relates to wheels, and, relates more particularly, to wheels of the type adapted for use on industrial trucks and the like and having removable tires secured thereto.

An object of my invention is to provide an improved wheel of the type referred to.

Another object of my invention is to provide improved means for securing the rim of a wheel, of the type referred to, to its central wheel structure.

Another object of my invention is to provide a removable tire supporting rim for a wheel, of the type referred to, so constructed and assembled that the tire may be easily removed from the wheel for repair or replacement.

Another object of my invention is to provide a removable tire supporting rim, for a wheel of the type referred to, so constructed that no outwardly radial movement therefrom of the tire is permitted.

Another object of my invention is to provide a removable tire supporting rim, for a wheel of the type referred to, so formed as to inter-lock with the tire.

Another object of my invention is to provide a removable tire supporting rim, for a wheel of the type referred to, which makes wedging engagement with a central wheel portion.

Another object of my invention is to provide a wheel of the type referred to having improved central wheel and hub portions.

Other objects of my invention and the invention itself will become apparent to those skilled in the art to which my invention appertains.

Figures 1, 2, 3:
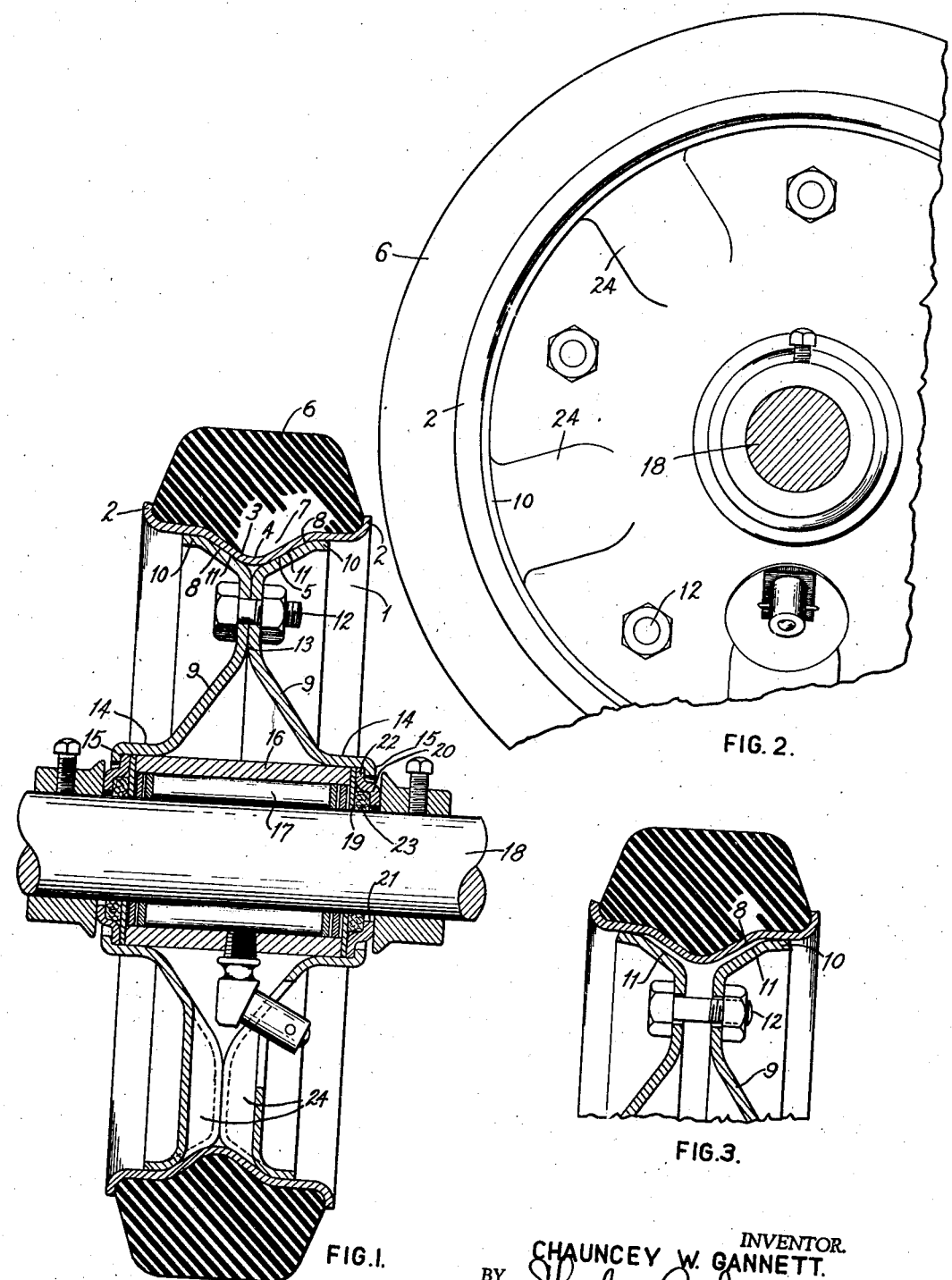
Fig. 1 is a cross-sectional view of a wheel embodying my invention.
Fig. 2 is a fragmentary side elevational view of the wheel of Fig. 1.
Fig. 3 is a view to a larger scale of a part of Fig. 1, illustrating a step in the process of assembling the wheel.

The subject matter of this application is divisional from my co-pending patent application, Serial No. 748,361, filed October 15, 1934, for Improvements in wheels, and such matter illustrated and described in this application but not claimed herein, will be claimed in the said co-pending application and notice of reference thereto is hereby given. Further reference may also be had to applicant's co-pending application, Serial No. 102,004, filed September 22, 1936, the subject matter of which application is further divisional from the above referred to co-pending application, Serial No. 748,361.

Referring to the drawing, in Figs. 1, 2 and 3 herein, I have illustrated at 1 a rim formed from sheet metal. Said rim 1 of my invention is, as is well known in the art, rolled from lengths of sheet metal and the ends abutted and welded together. Any other suitable method, however, may be utilized to form the rim 1. In cross-section said rim 1 is generally channel formed and its lateral flanges 2—2 are rounded. The web 3 thereof is depressed, as shown, to provide an outwardly concave recess 4 and an inward bead 5. A tire 6 of rubber or like cushioning material, is preferably vulcanized directly to said rim, in a manner well known in the art, substantially filling said rim and fitting, in the rim of my invention, into the recess 4 thereof, said recess cooperating with the said rim flanges 2—2 to retain said tires in the rim.

In vulcanizing a tire directly to a tire rim, the tire is generally compressed between axially approaching die elements and when the pressure of said die elements is applied to the tire, the tire in some instances, when rims of the prior art are used, tends to separate from the rim along the medial line thereof, forming a weak portion, or a cavity in the tire adjacent said rim. By providing a depressed portion 3 having a recess 4 in the rim 1, of my invention, a bead 7 of the tire extends from the body of the tire inwardly radially during the vulcanizing process filling the recess 4 and obviating the possibility of separation of tire and rim above described.

The rim 1 is provided on the radially inner side of the channel web 3 with oppositely inclined surfaces 8—8 substantially frusto-conical with respect to the wheel basis. A pair of discs 9—9 are formed with peripheral axially extending flanges 10—10 having oppositely inclined faces 11—11 formed thereon also generally frusto-conical with respect to the wheel axis, and the inclination of such faces 11—11 relative to the oppositely disposed inclined surfaces 8—8 is preferably such as to provide an angle therebetween of not less than 1 degree. This angle is most clearly illustrated in Fig. 3.

I have found, by making repeated tests, that it is exceedingly difficult to remove the discs 9—9 if the angular inclination of the rim surface 8—8 as viewed in Fig. 3, makes too small an angle with the wheel axis because the flanges 10—10 when wedged with the surfaces 8—8 become locked therewith and in the effort to unlock them, the flanges 10—10 of the disc 9—9 or the rim surfaces 8—8 will become scored or otherwise mutilated.

On the other hand, if the angular inclination is too great the flanges 10—10 resist being wedgingly drawn thereover and may be permanently bent and distorted when the same is attempted by drawing up the bolts 12—12. When the angular inclination of the rim surface 8—8 is suitably provided, then the corresponding angular inclination of the faces 11—11 must likewise be suitably pre-determined. If the angle is too great, the entire bending stress on the flange 10—10 will be applied thereto at the outer peripheral edge and may bend or distort them when the bolts 12 are being drawn up. If the angular inclination of the faces 11—11 is too small, the outer peripheral edges of the flanges 10—10 may not engage when the discs are drawn up by the bolts.

I have found by making said above referred to tests, that if the angular inclination of the rim surfaces 8—8 is not substantially less than 7 degrees, a suitable wedging action may be effected without undue liability that the discs will lock when it is desired to remove them; and that a suitable amount of bending of the flanges 10—10 will result if the inward axial divergence of the faces 11—11 and surfaces 8—8 is not substantially less than one degree and not more than 5 degrees.

The discs 9 may be drawn toward each other by bolts 12 to effect a wedging action between the faces 11 and 8 and, as shown in Fig. 1, may be drawn entirely together as at 13, in which position the flanges will engage the rim with a wedging action to secure the rim with the tire thereon to the disc.

The discs 9 are dished and have central tubular hub portions 14—14 thereon, terminating outwardly axially in inwardly radially directed flanges 15—15. A tubular bearing element 16 is telescoped into the tubular portion 14 when the discs 9—9 are assembled, as illustrated. Suitable roller or like bearing elements 17 may be disposed in the bearing element 16 to support an axle 18. Washers 19 are preferably disposed at the end of the tubular element 16 and hub elements 20—20 are provided, generally of cup form, with perforations 21—21 in the bottoms of the said cups embracing the axle 18 and with outwardly radially extending flanges 22—22 disposed between the washers 19 and the terminal flanges 15.

Upon tightening the bolts 12, the terminal flanges 15 will clamp the hub elements 21 and the washers 19 upon the ends of the bearing element 16 to provide a rigid hub construction. The tubular portion 14 is preferably cylindrical and is telescopically fitted with the outer wall of the tubular portion 14 and the outer peripheries of the washers 19 and flanges 15 preferably fit the inner wall of the tubular portion 14 to align the inner peripheries of the washers 19 and hub elements 21 with the axle 18 with a relatively close fit therein.

Packing material 23 may be disposed between the washers 19 and the bottoms of the cup-form hub elements 20. The discs 9—9 may further be provided with angularly spaced ribs 24 pressed therein for stiffness.

It will be observed that the depressed portion 4 of the channel-form rib serves three purposes; first, it interiorly provides an expansion recess into which the rubber of the tire may move upon being vulcanized under pressure to the rim, thus preventing outward radial movement thereof and resultant defects as known in the practice; secondly, the recess also provides for tongue-and-groove interlock connection between the tire and the rim; and thirdly, the depressed portion provides radially inwardly the rib for wedging engagement with the peripheral portions of the discs to secure the rim to the discs.

Although I have described my invention in its preferred form, it is to be understood that numerous changes and modifications may be made therein without, however, departing from the spirit and scope of my invention.

I claim:

1. In a wheel, a pair of central dished discs having tubular hub supporting portions extending in opposite axial directions terminating in radially inwardly extending terminal flanges, a tubular hub element telescoped within the tubular portions, cup-form hub elements at opposite ends of the tubular hub element having perforated bottoms, and having radially outwardly extending flanges disposed between the tubular element ends and the said terminal flanges, the cup bottoms extending axially outwardly beyond said terminal flanges to receive external axial thrusts.

2. In a wheel, a pair of central dished discs having tubular hub supporting portions extending in opposite axial directions terminating in radially inwardly extending terminal flanges, a tubular hub element telescoped within the tubular portions, washers upon which the hub element ends abut, cup-form elements having perforated bottoms providing inwardly extending flanges and having radially outwardly extending flanges disposed between the washers and the said terminal flanges, clamp means to draw the terminal flanges inwardly axially to clamp the cup flanges upon the washers and the washers upon the hub element ends, and the cup bottom flanges extending axially outwardly beyond said terminal flanges to receive external axial thrusts.

CHAUNCEY. W. GANNETT.